United States Patent [19]
Watanabe

[11] 3,877,040
[45] Apr. 8, 1975

[54] SWITCH ARRANGEMENT FOR ELECTRONIC SHUTTER OF TTL SINGLE LENS REFLEX CAMERA

[75] Inventor: Koichiro Watanabe, Funabashi, Japan

[73] Assignee: Asahi Kogaku Kogyo Kabushiki Kaisha, Tokyo, Japan

[22] Filed: May 14, 1973

[21] Appl. No.: 359,720

[30] Foreign Application Priority Data
May 16, 1972 Japan.................................. 47-48456

[52] U.S. Cl...................................... 354/51; 354/60
[51] Int. Cl............................. G01j 1/46; G03b 7/08
[58] Field of Search......... 95/10 CT; 354/50, 51, 60

[56] References Cited
UNITED STATES PATENTS
3,602,717   8/1971   Konig................................... 95/10 X Primary Examiner—Samuel S. Matthews
Assistant Examiner—J. A. LaBarre
Attorney, Agent, or Firm—Steinberg & Blake

[57] ABSTRACT

A camera circuit for controlling a shutter of the camera. The circuit includes a main switch movable from an open to a closed position to start a photographing operation. This circuit also includes a memory capacitor for storing a given charge in accordance with an exposure-determining factor such as brightness at the object to be photographed. A discharge circuit is connected across the memory capacitor in parallel therewith and includes a discharge switch adapted to be closed in order to discharge the memory capacitor during an interval between one photographing operation and the next photographing operation. Thus, the discharge switch is closed when the main switch is open, while the discharge switch is open when the main switch is closed.

4 Claims, 4 Drawing Figures

SWITCH ARRANGEMENT FOR ELECTRONIC SHUTTER OF TTL SINGLE LENS REFLEX CAMERA

BACKGROUND OF THE INVENTION

The present invention relates to cameras.

The invention relates in particular to cameras provided with electronic shutter-controlling circuits capable of automatically determining the exposure time. Such circuits are well known particularly in single lens reflex cameras where TTL (through the lens) light measurement is provided, such circuits normally including a memory capacitor for storing a charge determined in accordance with an exposure-determining factor such as brightness at the object to be photographed.

In accordance with the present invention an improvement is provided with respect to the transient characteristic of the voltage across the memory capacitor.

With circuits of the above type, particularly in the state which the circuit assumes with a long setting time after opening of a main current source switch, an abrupt closure of the latter switch is possible during the time when the memory capacitor still is in a transient state subsequent to the previous opening of the current source switch. Such operation can create inaccuracies. Thus, although the signal voltage corresponding to a light measurement value memorized by the memory section of the circuit is relatively small as compared with the current source voltage, it is required that the memorized value be accurate. Cameras are used both with relatively long time intervals and with relatively short time intervals between sequential photographing operations. In both cases it is important for stable shutter control to have the circuit in a uniform state immediately before closure of the current source switch at the start of a photographing operation. However, with a circuit of long setting time from a given circuit state change such as for example opening of the current source switch, different time intervals of camera operation cause different circuit states at the start of the photographing operation so that control errors will result.

SUMMARY OF THE INVENTION

It is accordingly a primary object of the present invention to provide circuitry which will avoid the above drawbacks.

Thus, it is an object of the present invention to provide an electronic circuit for controlling a camera shutter with a construction according to which control errors of the above type will be eliminated so that a highly accurate control of the exposure time can be achieved.

In accordance with the present invention, the circuit for controlling the shutter includes a main switch means movable from an open to a closed position to start a photographing operation, this main switch means being in its open position during an interval from one photographing operation to the next photographing operation. The circuit includes a memory capacitor means for storing a charge determined in accordance with an exposure-determining factor such as brightness at the object to be photographed. A discharge means is electrically connected with the memory capacitor means for discharging the latter during the interval from one photographing operation to the next photographing operation, so that in this way when a photographing operation is carried out the memory capacitor means will not have any residual charge remaining from a previous photographing operation.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
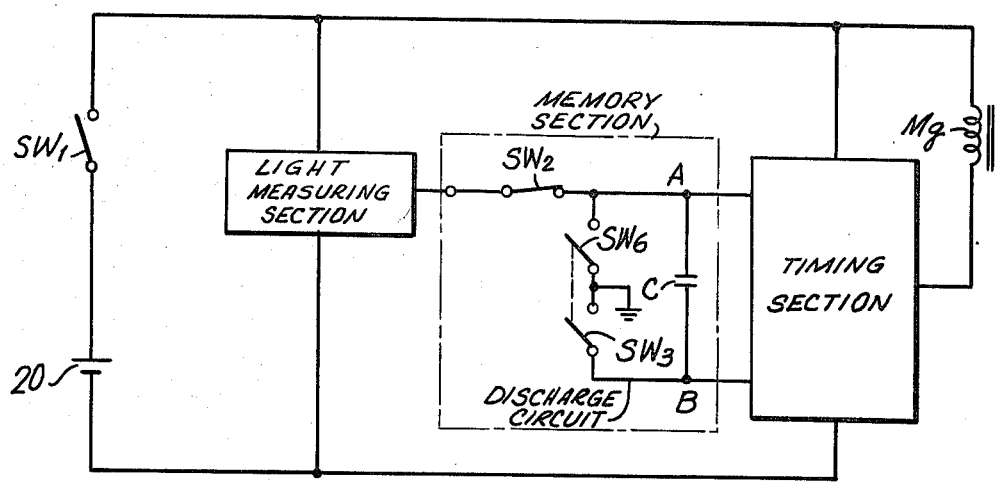
FIG. 1 is a partly schematic wiring diagram of an electronic circuit according to the present invention.

Referring to FIG. 1, the illustrated electronic circuit is suitable for controlling the exposure time in a TTL single lens reflex camera. As is indicated in FIG. 1, the circuitry includes a light measuring section as well as memory and timing sections, and generally there may be also a computation section. This circuitry includes elements such as semiconductor elements, as well as inductive, capacitive, and resistive elements, so that the circuit has complex transient characteristics resulting from operation of the current source switch $SW_1$. This latter switch $SW_1$ is a main switch closed in response to depression of a shutter-operating plunger, for example, during an initial part of the movement thereof, in order to render the circuit operative.

As is indicated in FIG. 1, between the terminals A and B there is a memory capacitor means C. In response to closing of the memory switch $SW_2$, an electrical value determined by the light measuring section will be stored by the memory capacitor C to be subsequently used upon opening of memory switch $SW_2$ by the timing section in order to determine the time during which the shutter remains open, this timing section operating in a known way to deenergize the electromagnet Mg in order to permit the shutter to run down to its closed position and thus terminate an exposure.

In accordance with the invention there is connected in parallel across the memory capacitor means C a discharge circuit means which includes a discharge switch in the form of a mechanical or semiconductor switch $SW_3$. During a time interval from transmission of a signal from the timing section to the electromagnet Mg which terminates a photographing operation until the next closing of the switch $SW_1$ for the next photographing operation, the switch $SW_3$ is closed so that the memory capacitor means C will discharge any residual signal charge remaining due to the previous photographing operation. At any other times except the interval from the completion of one photographing operation until the next photographing operation the switch $SW_3$ remains open. As is schematically indicated in FIG. 1, the switch $SW_3$ operates simultaneously with a second switch $SW_6$, and between these switches there is a connection to ground, such as a connection to the casing of the camera, so that upon closing of the switches $SW_3$ and $SW_6$ the discharge circuit will operate effectively to bring about a rapid discharge of the capacitor means C. Thus, immediately before closing of the main or current source switch means $SW_1$, which is connected in the manner shown in FIG. 1 to the battery 20, the capacitor means C will always have the same initial condition. Therefore, in the charging transient characteristic of the voltage across the capacitor C there is no superposition of the transient voltage across the capacitor resulting from opening of the current source switch $SW_1$, so that improvement of the charging transient characteristic of the capacitor C is provided.

Figure 2:
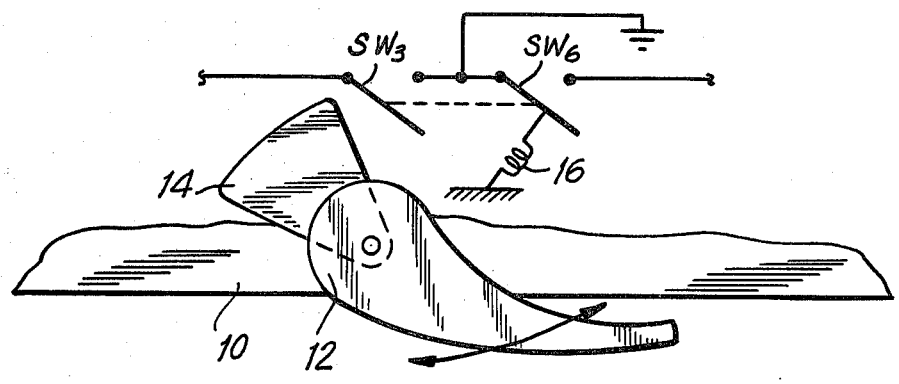
FIG. 2 schematically illustrates one possible structure for operating the discharge circuit of the invention.

As an example of a means accessible to the operator for assuring proper discharge of the capacitor C during the interval from one photographing operation to the next photographing operation, there is shown in FIG. 2 in a fragmentary schematic manner the camera housing 10 which carries in a known way the shutter cocking lever 12 which is turned in a clockwise direction, as viewed in FIG. 2, and then released to return to its position shown in FIG. 2, in order to cock the shutter and advance the film, as is well known. The swingable lever 12 is operatively connected with a cam 14 which turns with the lever 12, and the switch $SW_3$ is located in the path of movement of the cam 14 so as to be closed whenever the lever 12 is manipulated by the operator to cock the shutter. FIG. 2 shows also the switch $SW_6$ and the ground connection as well as a spring for holding the switches $SW_3$ and $SW_6$ in their open position except when the operator closes these switches during cocking of the shutter, for example.

Figure 3:
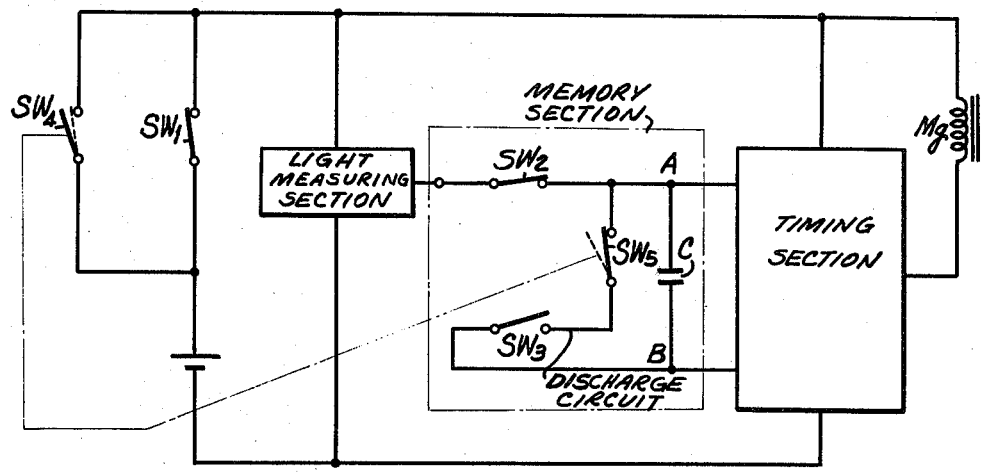
FIG. 3 is a schematic wiring diagram of a variation of the circuit of FIG. 1.

As may be seen from FIG. 3, it is also possible to connect into the discharge circuit in series with the switch $SW_3$ an additional switch $SW_5$ which is connected through a suitable transmission with a switch $SW_4$ which is adapted to be opened and closed simultaneously with the switch $SW_1$. Thus, in FIG. 3 the switches $SW_1$ and $SW_4$ form the main switch means for starting a photographing operation when the switches $SW_1$ and $SW_4$ are closed, these switches assuming an open position when the photographing operation is completed. The mechanical connection between the switches $SW_4$ and $SW_5$ is such that the switch $SW_5$ is closed when the switch $SW_4$ opens while the switch $SW_5$ is open when the switch $SW_4$ closes.

Thus, with the arrangement as illustrated in FIG. 3, when the pair of switches $SW_1$ and $SW_4$ open, the switch $SW_5$ closes, and of course with the closing of the switch $SW_3$ as described above, the memory capacitor C will be discharged in the interval from one exposure to the next exposure. At the same time, upon closing of the switches $SW_1$ and $SW_4$, the switch $SW_5$ necessarily opens, so that even if the switch $SW_3$ should be closed at this time due to some unforeseen circumstance, then because the switch $SW_5$ opens, the short-circuiting of the capacitor C will be prevented, so that this arrangement of FIG. 3 provides an additional safety feature.

The resistance of the discharge circuit may be made great enough to avoid the necessity for a ground connection.

Figure 4:
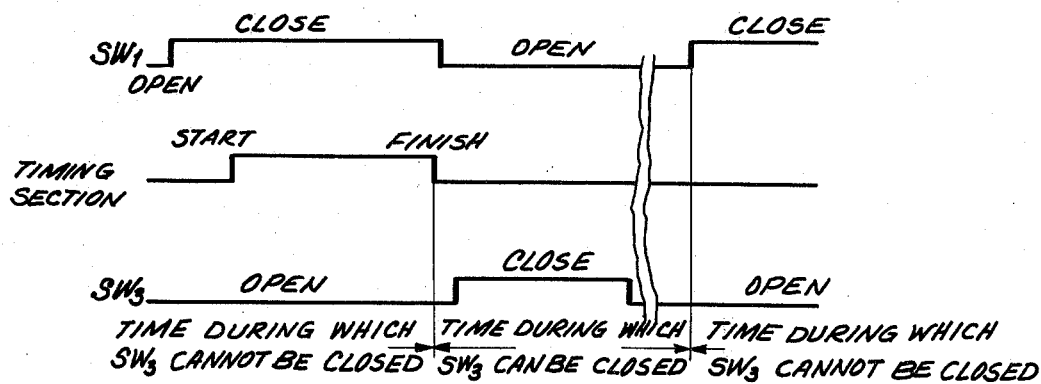
FIG. 4 is a time line illustration of the operating relationships between components of the invention.

Referring to the time chart shown in FIG. 4, the upper and lower time lines illustrate the operation of the switches $SW_1$ and $SW_3$, while the intermediate time line illustrates the operation of the timing section which in response to the charge received from the memory capacitor C will in a known way bring about deenergizing of the electromagnet Mg at the proper instant to terminate the exposure as is well known. As may be seen from FIG. 4, when the main switch means $SW_1$ is closed, as for example during the initial part of the movement of a shutter-tripping plunger or button, or when a motor drive brings about the initial part of the operation in connection with a photographing operation, the switch $SW_3$ is open. On the other hand, when the switch $SW_1$ is open, as for example because of the return of the shutter-tripping button or plunger to its starting position or because of the return of the tiltable mirror of the single lens reflex camera into its rest position extending across the path of light through the objective, upon completion of a photographing operation, the switch $SW_3$ is closed, to bring about discharge of the capacitor C as pointed out above. The timing section starts its operation in synchronism with opening of the shutter, as is well known, and the operation of the timing section terminates at the end of the exposure time which is automatically determined. As is shown in FIG. 2, the switch $SW_3$ is closed in response to manual operation of the lever which cocks the shutter and advances the film for the next photographing operation, and this closure of the switch $SW_3$ takes place in such a way that the switch $SW_3$ is closed during the initial part of the movement of the lever 12 with the switch $SW_3$ remaining closed until the last part of the movement of the lever 12.

Thus, the switch $SW_3$ is closed only during intervals when the switch $SW_1$ is open and the timing section does not operate, and this sequence of operations is repeated at each cycle, as is apparent from FIG. 4.

Of course, the relationship between the switch $SW_3$ and the camera mechanism as pointed out above is only by way of example since the switch $SW_3$ can be operated in response to movement of other camera mechanisms as long as the timing sequence conforms to the illustration in FIG. 4. Thus, with the present invention a discharge means for short-circuiting the memory capacitor means is provided in such a way that the discharge takes place within the interval from the completion of one operating cycle of the shutter to the closure of the current source switch $SW_1$ in order to initiate the next photographing operation, so that by the time the switch $SW_1$ is closed the capacitor C has been completely discharged. As a result, the initial condition of the capacitor C for each photographing operation is maintained constant, and in this way a highly accurate control of the shutter is assured.

What is claimed is:

1. In a camera, an electrical circuit for controlling a shutter of the camera, said circuit including a main switch means movable from an open to a closed position for starting a photographing operation, said main switch means being in its open position during an interval between one photographing operation and the next photographing operation, memory capacitor means forming part of said circuit for storing a charge determined in accordance with an exposure-determining factor and discharge means electrically connected with said memory capacitor means for discharging the latter when said main switch means is in its open position during an interval between a pair of successive photographing operations, so that said capacitor means is not influenced during one photographing operation by any residual charge retained by said memory capacitor means from a previous photographing operation, said discharge means including a discharge circuit means connected across said memory capacitor means in parallel therewith and including a discharge switch for closing said discharge circuit means only when said main switch means is in its open position during said interval between a pair of successive photographing operations, and manually operable means cooperating with said discharge switch for closing the latter after one photographing operation is completed and before the next photographing operation starts.

2. The combination of claim 1 and wherein said manually operable means includes a shutter-cocking lever accessible to the operator for cocking a shutter of the camera in preparation for a photographing operation, and means actuated by said shutter-cocking lever during cocking of the camera shutter to close said discharge switch when said lever is manipulated to cock a shutter of the camera.

3. In a camera, an electrical circuit for controlling a shutter of the camera, said circuit including a main switch means movable from an open to a closed position for starting a photographing operation, said main switch means being in its open position during an interval between one photographing operation and the next photographing operation, memory capacitor means forming part of said circuit for storing a charge determined in accordance with an exposure-determining factor and discharge means electrically connected with said memory capacitor means for discharging the latter when said main switch means is in its open position during an interval between a pair of successive photographing operations, so that said capacitor means is not influenced during one photographing operation by any residual charge retained by said memory capacitor means from a previous photographing operation, said discharge means including a discharge circuit means having a discharge switch which is closed to close said discharge circuit means for discharging said memory capacitor means, said main switch means being connected with said discharge switch for closing the latter when said main switch means is open and for opening said discharge switch when said main switch means is closed.

4. In a camera, an electrical circuit for controlling a shutter of the camera, said circuit including a main switch means movable from an open to a closed position for starting a photographing operation, said main switch means being in its open position during an interval between one photographing operation and the next photographing operation, memory capacitor means forming part of said circuit for storing a charge determined in accordance with an exposure determining factor memory switch means electrically connected with said memory capacitor means for transmitting a charge to be stored thereby when said memory switch means is closed and for assuming an open position while said memory capacitor means retains its charge, discharge means electrically connected with said memory capacitor means for discharging the latter when said main switch means is in its open position during an interval between a pair of successive photographing operations, so that said capacitor means is not influenced during one photographing operation by any residual charge retained by said memory capacitor means from a previous photographing operation, said discharge means including a discharge circuit means connected across said memory capacitor means in parallel therewith and including a discharge switch for closing said discharge circuit means only when said main switch means is in its open position during said interval between a pair of successive photographing operations.

* * * * *